US005668805A

United States Patent [19]

Yoshinobu

[11] Patent Number: 5,668,805

[45] Date of Patent: Sep. 16, 1997

[54] MULTIPLEX BROADCASTING METHOD AND SYSTEM

[75] Inventor: Hitoshi Yoshinobu, Kanagawa, Japan

[73] Assignee: Sony Corporation, Tokyo, Japan

[21] Appl. No.: 344,751

[22] Filed: Nov. 23, 1994

[30] Foreign Application Priority Data

Nov. 25, 1993 [JP] Japan .................................... 5-319101

[51] Int. Cl.[6] .............................. H04H 5/00; H04J 13/00

[52] U.S. Cl. .......................... 370/335; 370/342; 370/441; 348/7; 348/473

[58] Field of Search .............................. 455/3.1, 3.2, 4.1, 455/4.2; 348/6, 7, 8, 467, 473, 474, 725, 729; 375/205, 295, 316, 379; 380/10, 19, 20, 21; 370/313, 314, 320, 328, 335, 342, 441, 480, 487, 532, 535, 537, 542

[56] References Cited

U.S. PATENT DOCUMENTS 3,927,250 12/1975 Rainger .................................. 348/467
5,260,778 11/1993 Kauffman et al. ...................... 348/473
5,319,454 6/1994 Schutte ........................................ 348/7
5,400,402 3/1995 Garfinkle .................................... 348/7
5,406,558 4/1995 Rovira et al. ............................ 370/77

*Primary Examiner*—Benedict V. Safourek
*Assistant Examiner*—Ricky Ngo
*Attorney, Agent, or Firm*—Charles M. Fish, Esq.; Jerry A. Miller; Charles J. Kulas, Esq.

[57] ABSTRACT

A multiplex broadcasting method and system which limits an object district for broadcasting of district information such as a commercial message relating closely to the district is disclosed. On the broadcasting station side, multiplex data such as animation are broadcast with a district code such as a postal code number added thereto. On the receiving set side, a district code of the location is registered as an identification number of the multiplex broadcast receiving set in a memory in advance, and the district code of received multiplex data separated by a data extraction circuit and the identification number stored in the memory are compared with each other. Only when they coincide with each other, an image corresponding to the received multiplex data is displayed on the receiving set.

22 Claims, 7 Drawing Sheets

F I G. 2
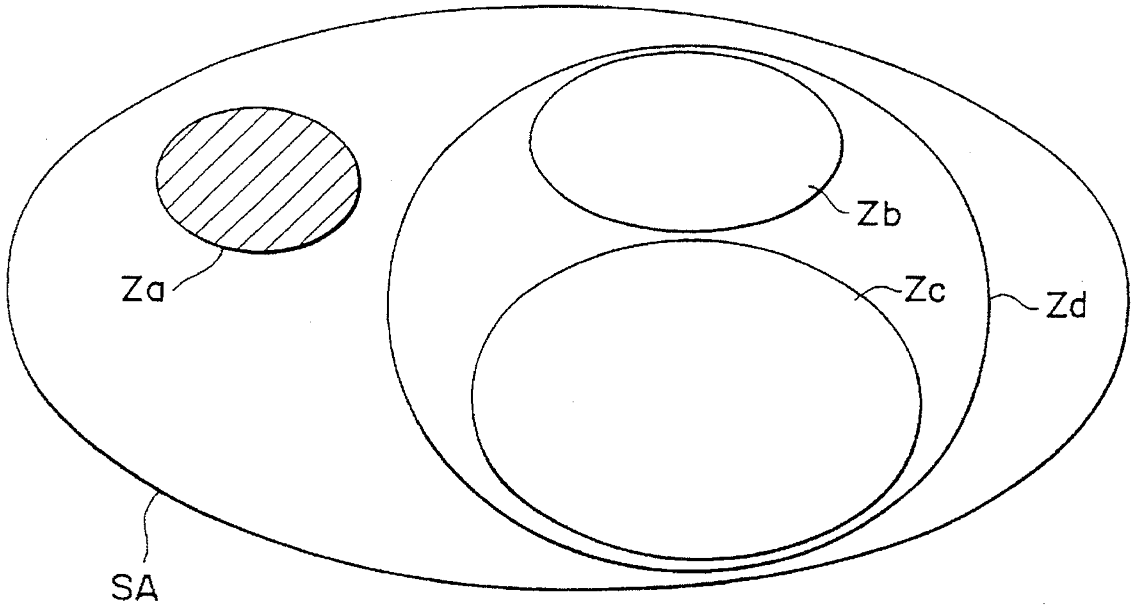

PLEASE INPUT A POSTAL CODE NUMBER

| 2 | 1 | 3 | * | * |

10CH = DETERMINATION
11CH = TERMINATION    12CH = CLEAR (*)

MULTIPLEX BROADCASTING METHOD AND SYSTEM

BACKGROUND OF THE INVENTION

This invention relates to a multiplex broadcasting method and system for broadcasting main broadcasting information together with predetermined sub broadcasting information multiplexed with the main broadcasting information such as, for example, character multiplex broadcasting as well as a receiving apparatus for the broadcast.

Character multiplex broadcasting is conventionally known wherein image information constituted from characters and/or graphic forms is multiplexed in a digital signal with a television signal and sent out and the signal is decoded and displayed on a television receiver on the receiving side.

On the sending out side, additional sound is combined in accordance with the necessity with a screen including characters and/or a graphic form or forms to produce a character broadcasting screen. Each such character broadcasting screen is coded, and data designating a program number, a page number, a display mode and so forth are added to the coded character broadcasting screen.

A synchronizing code, an error correction code and so forth are further added to form a character signal, and the character signal is transmitted in a superimposed relationship in the 14th H (H denotes a horizontal section) to 16th H and the 21th H in a vertical blanking period.

On the receiving side, the character signal is separated from a demodulated video signal, and the character broadcasting data are decoded after error correction processing of the character signal. In accordance with the data, a pattern data or a graphic data read out from a ROM is written into a display memory, converted into a video signal and displayed on an image receiving tube.

It is to be noted that the image information may be printed as a hard copy by a printer.

Further, electronic sound is reproduced from a loudspeaker in response to the additional sound data.

In a character multiplex broadcast, data lines of the hierarchy 2 superimposed in one horizontal scanning period are divided into a synchronizing section of 24 bits and a data packet (hierarchy 3) of 272 bits.

Program data of the hierarchy 5 include, as shown in FIG. 6, program management data and individual page data, and a program data header includes a number for identification of the program and another number for identification of a group of programs.

It is to be noted that, as the related art, it is disclosed in U.S. Pat. No. 4,706,121 that program information is superimposed with a V-BLK of a television broadcasting signal and a video tape recorder is controlled in accordance with the thus superimposed signal.

By the way, conventionally in a private television broadcast (ground wave) or a broadcast based on a communications satellite (CS), when a commercial message (CM) is broadcast, since it is broadcast by way of an ordinary image and sound, naturally the entire service area SA (at least the area of a district or the entire country) of the broadcasting station makes an object area ZCM of the commercial message broadcasting as seen in FIG. 7.

Meanwhile, in CATV systems of the multi-channel type which have increased suddenly in recent years, a television broadcasting program of a ground wave of a VHF or UHF is re-transmitted by way of a transmission medium such as a coaxial cable and a sustaining program distributed by way of a communications satellite is transmitted in a mid band or a super high band to distribute such programs to a great number of subscribers. However, a commercial message is broadcast in the area of a district or the entire country similarly as in an ordinary television broadcast.

Consequently, there is a problem in that the advertising rates by a conventional television broadcast are naturally so high that, for example, a small or medium enterprise of the type which is closely related to a district cannot make use of an advertisement by television broadcasting even if it is broadcast only within the district since the economical burden to the enterprise is excessively high.

Further, in a conventional television broadcast, for example, information relating to a district such as, for example, weather information or road information is successively broadcast in the scale of the entire country or the district. Accordingly, a conventional television broadcast cannot provide detailed information which are different among different districts.

SUMMARY OF THE INVENTION

It is an object of the present invention to provide a multiplex broadcasting method and system by which district information which is significant only with a particular district of a comparatively small area such as a commercial message closely relating to the district can be broadcast to a limited broadcasting area.

In order to attain the objects described above, according to an aspect of the present invention, there is provided a multiplex broadcasting method wherein, on a broadcasting station side, sub broadcasting information is coded and then multiplexed with and broadcast together with main broadcasting information, and on a receiving side, the received multiplex broadcasting information is separated into the main broadcasting information and the coded sub broadcasting information and then the coded sub broadcasting information is decoded and outputted together with the main broadcasting information, comprising the steps of adding, on the broadcasting station side, district limit information to the sub broadcasting information, coding the sub broadcasting information together with the district limit information and multiplexing the coded information with the main broadcasting information, and comparing, on the receiving side, particular district limit information set on the receiving side and the district limit information added to the decoded sub broadcasting information with each other and outputting the decoded sub broadcasting information when the particular district limit information and the district limit information of the decoded sub broadcasting information coincide with each other.

In order to reduce the multiplex broadcasting method to practice, according to another aspect of the present invention, there is provided a multiplex broadcasting system, comprising a broadcasting station including means for coding sub broadcasting information together with district limit information, means for multiplexing the coded information with main broadcasting information, and means for transmitting the multiplexed broadcasting information, and a receiving apparatus including means for receiving the multiplexed broadcasting information from the broadcasting station, means for separating the coded sub broadcasting information from the received multiplexed broadcasting station, means for decoding the thus separated coded sub broadcasting information, means for comparing the district limit information included in the decoded sub broadcasting information with particular district limit information and allowing outputting of the sub broadcasting information when the comparison proves that the particular district limit information and the district limit information of the sub broadcasting information coincide with each other.

The district limit information may be a postal code number or a telephone exchange number.

According to a further aspect of the present invention, there is provided a receiving method for a multiplex broadcast, comprising the steps of receiving multiplex broadcasting information, separating coded sub broadcasting information from the received multiplex broadcasting station, decoding the thus separated coded sub broadcasting information, comparing district limit information included in the decoded sub broadcasting information with particular district limit information, and outputting the sub broadcasting information when the comparison proves that the particular district limit information and the district limit information of the sub broadcasting information coincide with each other.

In order to reduce the receiving method to practice, according to a still further aspect of the present invention, there is provided a receiving apparatus for a multiplex broadcast, comprising receiving means for receiving multiplex broadcasting information, separating means for separating coded sub broadcasting information from the received multiplex broadcasting station, decoding means for decoding the thus separated coded sub broadcasting information, storage means for storing particular district limit information, comparing means for comparing the particular district limit information stored in the storage means and district limit information included in the sub broadcasting information decoded by the decoding means with each other, and means for outputting the sub broadcasting information when it is determined by the comparing means that the particular district limit information of the storage means and the district limit information of the sub broadcasting information coincide with each other.

According to a yet further aspect of the present invention, there is provided a transmitting and receiving method for a multiplex broadcast, comprising the steps of adding, on the transmitting side, district limit information to sub broadcasting information, coding the sub broadcasting information together with the district limit information, multiplexing the coded information with main broadcasting information, and transmitting the multiplexed broadcasting information, and receiving, on a receiving side, the multiplexed broadcasting information, separating coded sub broadcasting information from the received multiplexed broadcasting station, decoding the thus separated coded sub broadcasting information, comparing district limit information included in the decoded sub broadcasting information with particular district limit information, and outputting the sub broadcasting information when the comparison proves that the particular district limit information and the district limit information of the sub broadcasting information coincide with each other.

In order to reduce the transmitting and receiving method to practice, according to a still further aspect of the present invention, there is provided a transmitting and receiving apparatus for a multiplex broadcast, comprising a transmitting apparatus including means for adding district limit information to sub broadcasting information, coding means for coding the sub broadcasting information together with the district limit information, multiplexing means for multiplexing the coded information with main broadcasting information, and transmitting means for transmitting the multiplexed broadcasting information, and a receiving apparatus comprising receiving means for receiving the multiplexed broadcasting information, separating means for separating the coded sub broadcasting information from the received multiplexed broadcasting station, decoding means for decoding the thus separated coded sub broadcasting information, storage means for storing particular district limit information, comparing means for comparing the district limit information included in the decoded sub broadcasting information with the particular district limit information stored in the storage means, and outputting means for outputting the sub broadcasting information when it is determined by the comparing means that the particular district limit information and the district limit information of the sub broadcasting information coincide with each other.

The district limit information may be a postal code number or a telephone exchange number.

With the methods and the apparatus of the present invention, on the broadcasting station side, sub broadcasting information with district limit information added thereto is multiplexed with main broadcasting information, and on the receiving side, only when the district limit information of the received sub broadcasting information and particular district limit information set on the receiving side coincide with each other, the sub broadcasting information is outputted. Consequently, the district in which the sub broadcasting information can be received can be limited. Consequently, necessary information can be provided for individual different districts.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view illustrating operation of the multiplex broadcasting system according to the present invention;

DESCRIPTION OF THE PREFERRED EMBODIMENT

[Limitation in Broadcasting Area]

First, limitation in broadcasting area in a multiplex broadcasting method and system according to a preferred embodiment of the present invention will be described with reference to FIG. 2.

In the present embodiment, a district code corresponding to a broadcasting object district is included in district information such as a commercial message which closely relates to the district, and is broadcast in the form of image information of such a character multiplex broadcast as described above.

For example, as seen in FIG. 2, pieces of information A, B and C are broadcast only to object districts Za, Zb and Zc, respectively, of a service area SA of a broadcasting station. Meanwhile, a further piece of information D is broadcast to an object district Zd which includes the districts Zb and Zc.

Figure 6:
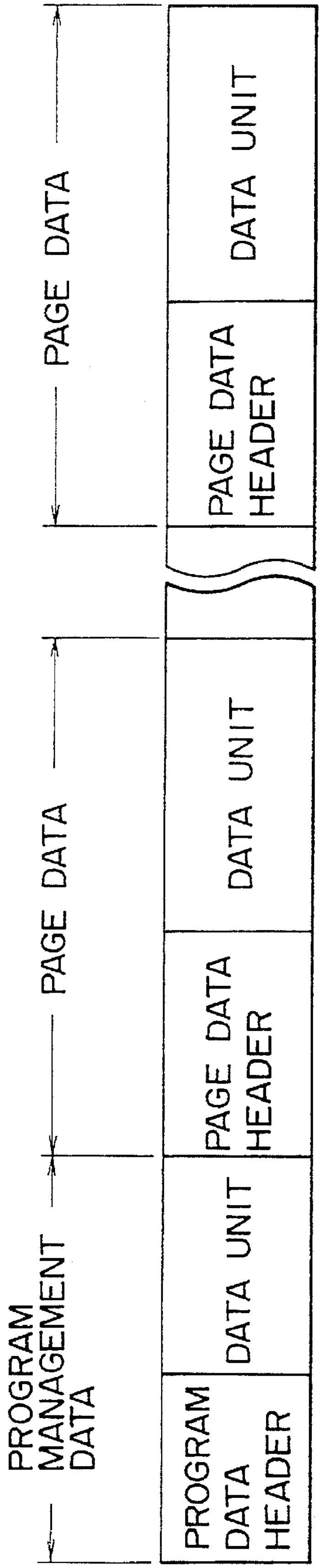
FIG. 6 is a diagrammatic view illustrating the structure of a program data employed in the multiplex broadcasting system of the present invention.
Figure 7:
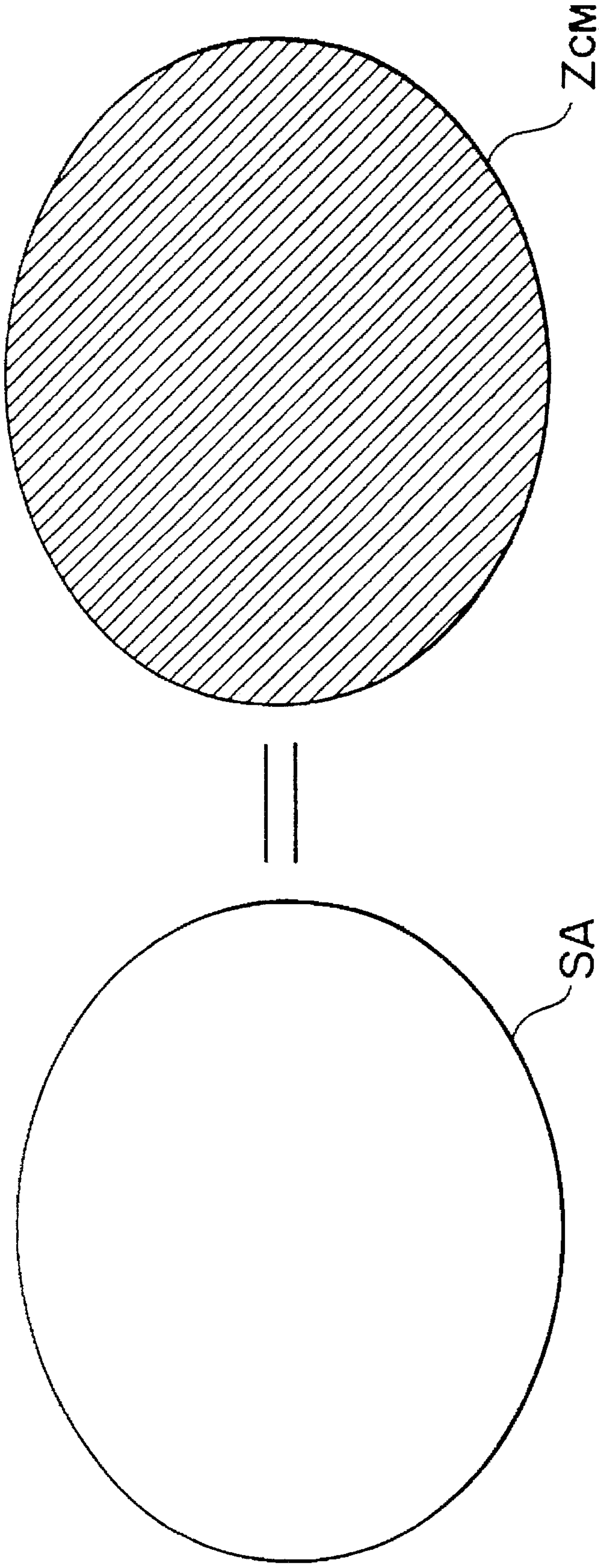
FIG. 7 is a diagrammatic view illustrating the relationship between a service area of a broadcasting station and an object area of a commercial message broadcast in the multiplex broadcasting system of the present invention.

In order to limit the broadcasting area, district codes of the object areas such as, for example,

| Information | District | District Code |
|---|---|---|
| A | Za | 12345 |
| B | Zb | 23456 |
| C | Zc | 24567 |
| D | Zd | 2XXXX |

are provided as part of such program management data as described hereinabove with reference to FIG. 6 to the individual pieces of information.

The broadcasting area can be controlled suitably by designating a district code with a suitable number of places from the top place or by coupling a plurality of commodity codes by way of "&" (AND, that is, logical AND) or "OR" (logical OR).

Such district codes as described above are preferably determined in accordance with the postal code number system of each country such as the postal code number system of Japan or the zip code system of the United States in order to definitely limit object districts hierarchically and to allow collective management and strict updating of information. It is to be noted that it is possible to limit a district using an area number+an exchange number of a telephone number. However, the limitation based the postal code number system is advantageous in that a limited district is smaller in size.

[Broadcasting of Limited District Commercial Message]

On the broadcasting station side, a preparation signal (sign) for broadcasting of a character multiplex commercial message is broadcast as character multiplex data several times prior to a timing at which a commercial message is to be broadcast taking a sufficient time margin into consideration, and then, a plurality of character multiplex commercial message data to which such district codes as described above are added are repetitively inserted (multiplexed) into a plurality of frames and broadcast.

Then, at the timing at which the commercial message is to be broadcast, a signal (sign) to start displaying of a commercial message is broadcast as character multiplex data. The start signal has an identification number corresponding to the preparation signal applied thereto.

After the broadcasting time for the commercial message comes to an end, a signal (sign) to end the displaying of the commercial message is broadcast as character multiplex data. Also the end signal has an identification number corresponding to the preparation number applied thereto.

When the commercial message is broadcast successively, the cycle of operations beginning with sending out of a preparation signal and ending with sending out of a start signal described above is repeated by a plurality of times, and on the receiver side, one of the received commercial messages broadcast in the broadcasts is displayed.

It is to be noted that a signal of each sign is broadcast by a plurality of times taking the possibility of a miss of a signal on the receiver side into consideration. Particularly, an end signal is broadcast successively for a certain period of time.

[Construction of Receiving Apparatus]

Subsequently, a receiving apparatus for a multiplex broadcast employed in the embodiment of the present invention will be described with reference to FIGS. 1 and 3 to 5.

Figure 1:
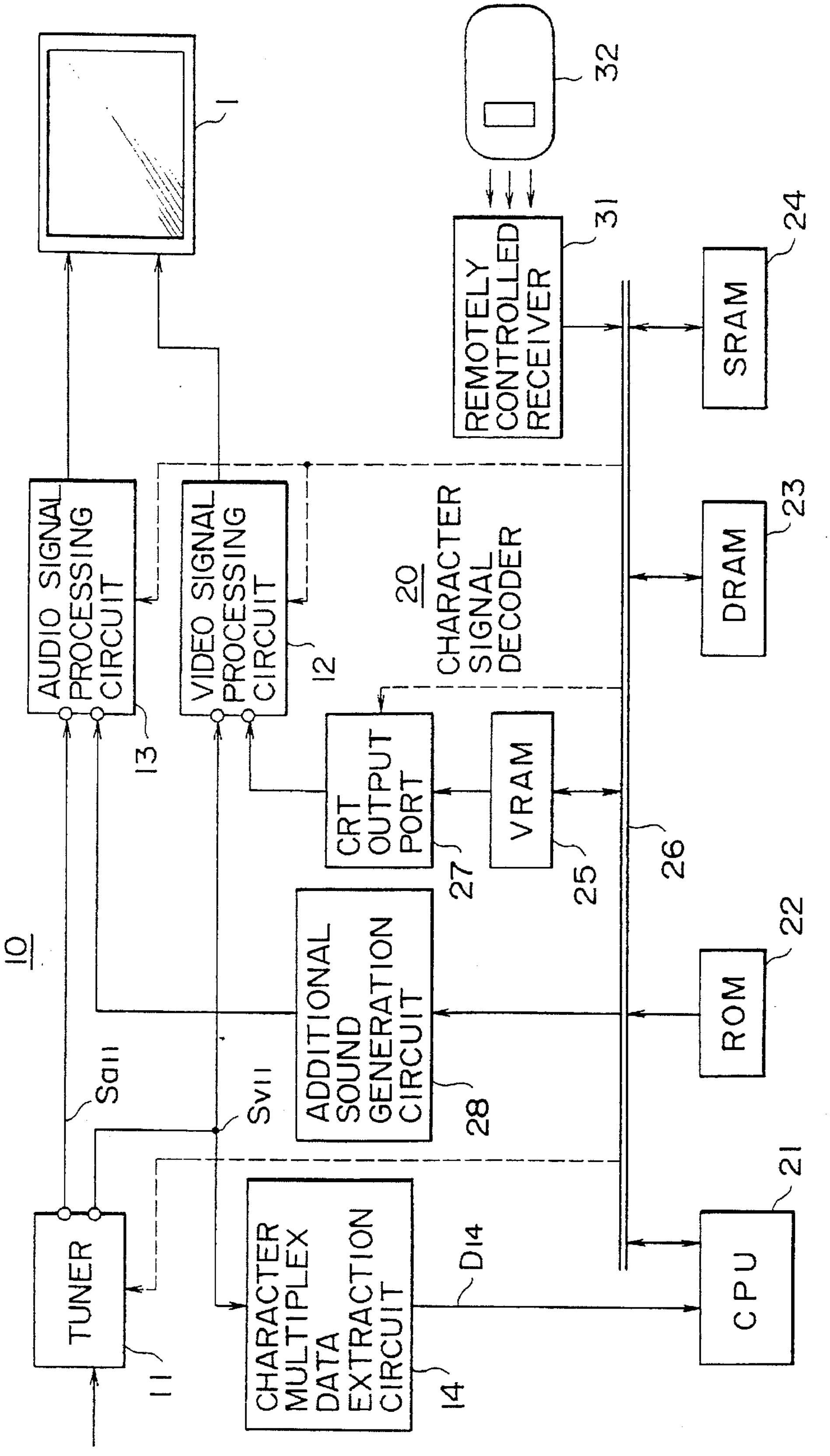
FIG. 1 is a block diagram of a receiving apparatus for a multiplex broadcast which is broadcast in a multiplex broadcasting system showing a preferred embodiment of the present invention.

Referring first to FIG. 1, the receiving apparatus is generally denoted at 10 and constructed so as to receive a character multiplex broadcasting signal. The receiving apparatus 10 includes a tuner 11, from which a video signal Sv11 and an audio signal Sa11 are supplied by way of a video signal processing circuit 12 and an audio signal processing circuit 13, respectively, to a receiving set 1 connected as an external apparatus to the receiving apparatus 10.

Where the receiving apparatus 10 is, for example, a receiver terminal (normally called cable box or home terminal) provided in accordance with a contract with a CATV system, since a pay broadcasting program such as a pay television or pay per view is in a scrambled condition, a descrambler is included in the tuner 11. This similarly applies where the receiving apparatus 10 is a decoder for satellite pay broadcasting.

The receiving apparatus 10 further includes a character multiplex data extraction circuit 14 which receives a video signal Sv11 supplied thereto from the tuner 11 and extracts such character multiplex data D14 as described hereinabove. The data D14 are supplied to a CPU 21 of a character signal decoder 20.

The character signal decoder 20 includes, in addition to the CPU 21, a ROM 22, a DRAM 23, an SRAM 24 and a VRAM 25, which are connected to each other by way of a bus 26. The character signal decoder 20 further includes a CRT output port 27 and an additional sound generation circuit 28 connected to the VRAM 25 and the bus 26, respectively.

The outputs of the CRT output port 27 and the additional sound generation circuit 28 are supplied to the video signal processing circuit 12 and the audio signal processing circuit 13, respectively.

Further, a remotely controlled receiver 31 is connected to the bus 26, and control data based on a manual operation of a remotely controlled transmitter (commander) 32 are inputted to the CPU 21 by way of the remotely controlled receiver 31.

It is to be noted that several components of the receiving apparatus 10 are controlled by the CPU 21 as indicated also by broken lines in FIG. 1.

Control programs for the components of the receiving apparatus 10 are stored in the ROM 22, and also data of fonts and graphics for use for display are stored in the ROM 22.

Meanwhile, the DRAM 23 is utilized principally as a working area, and district codes and so forth are stored in the SRAM 24. The VRAM 25 is used for display data.

[Registration of District Code]

Subsequently, registration of a district code in the embodiment of FIG. 1 will be described with additional reference to FIGS. 3 and 4.

Figure 3:
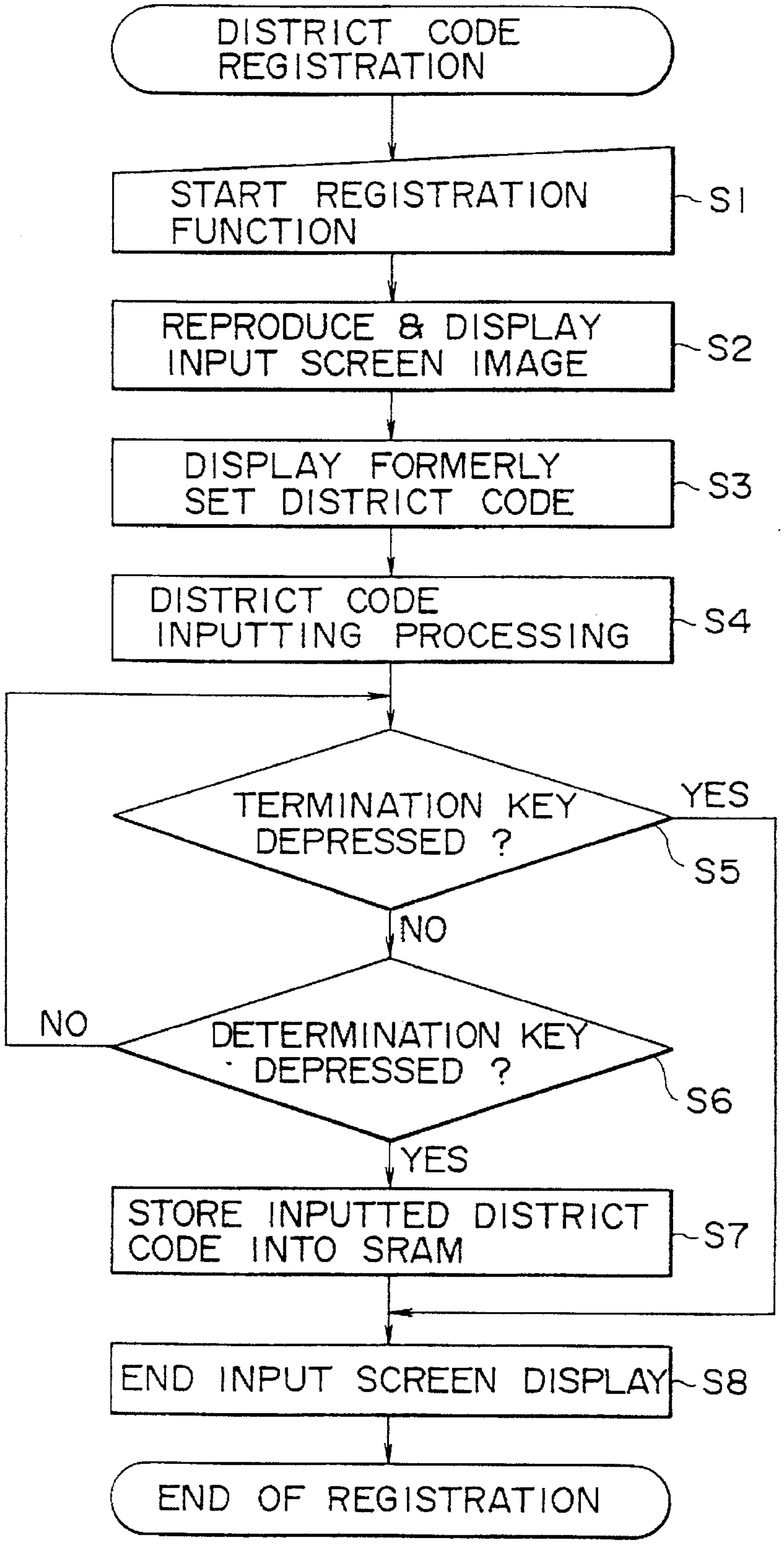
FIG. 3 is a flow chart illustrating operation of the receiving apparatus shown in FIG. 1.
Figure 4:
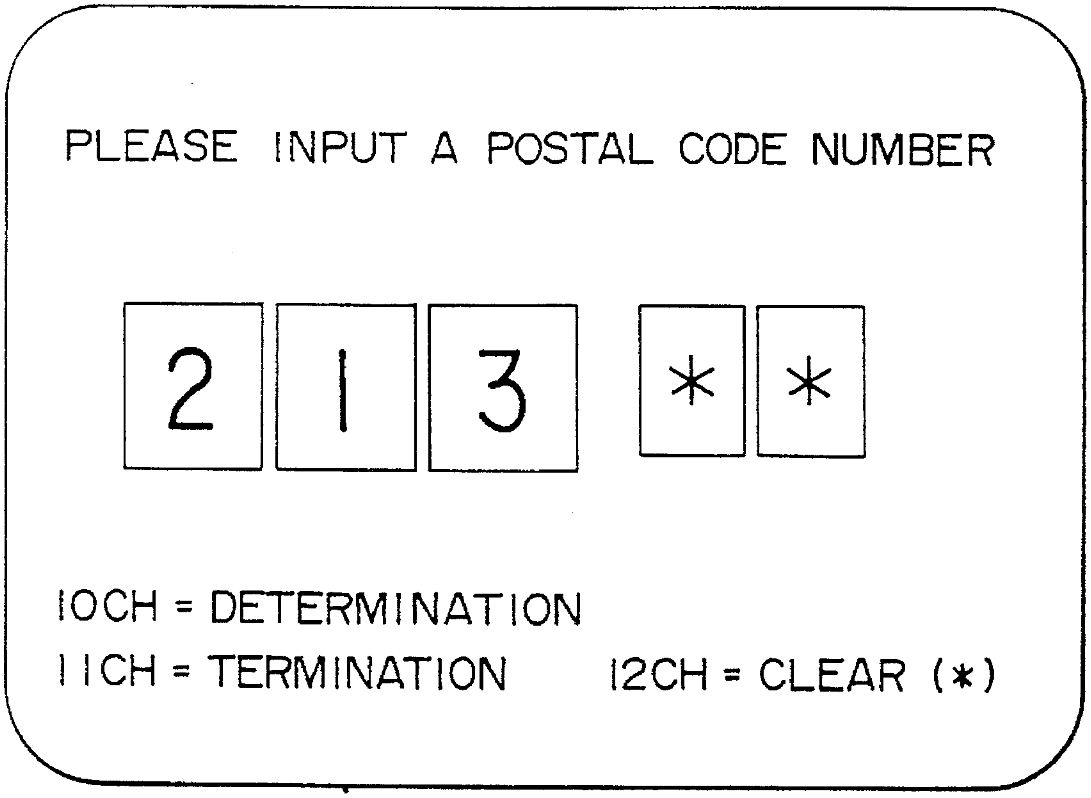
FIG. 4 is a diagrammatic view showing a display screen of the receiving apparatus shown in FIG. 1.

In registration of a commodity code, if a predetermined key of the commander 32 is manually operated to start a district code setting function of the CPU 21 as seen in FIG. 3 (step S1), then font and/or graphic data in the ROM 22 are composed in accordance with a program in the ROM 22 to produce such an input screen image including a guidance to inputting of a district code as illustrated in FIG. 4 in the VRAM 25. The image is merged with a video signal by way of the CRT output port 27 so that it is converted into a signal to be displayed in an overlaid condition on a display, and the signal obtained by the conversion is displayed on the receiving set 1 (step S2).

It is to be noted that the district code registration processing may be automatically started without fail upon initial setting of a cable box after the cable box is laid.

Further, a district code set already and stored in the SRAM 24 is displayed as corresponding font data are transferred to the VRAM 25 and merged with the video signal by way of the CRT output port 27 (step S3). Lower significant digits of the district code for which no specific value is intended can be indicated with the "*" character.

Then, in accordance with the guidance displayed on the receiving set 1 at step S2, a district code is inputted by manual operation of digit keys and/or a function key such as, for example, a channel key of the commander 32 (step S4). Each digit thus inputted is displayed in a similar manner as at step S3.

The inputting processing at step S4 is repeated until after, for example, a CH11 key (key for the channel number 11; this similarly applies in the following description) as a termination key or a CH10 key as a determination key is depressed (steps S5 and S6). It is to be noted that a CH12 key is applied as a clear key.

When the determination key is depressed, the district code inputted is converted into a BCD code and stored into the SRAM 24, and then the input screen displaying is ended (steps S7 and S8). On the other hand, when the termination key is depressed, the input screen displaying is ended without storing the inputted district code.

As described above, in the present embodiment, the user can set a district code of a location of the receiving apparatus readily in accordance with a guidance displayed on the receiving set 1. Accordingly, even when the user has moved or when the district code of the location has been changed, a new district code can be set with certainty.

[Reception of Limited District Commercial Message]

Subsequently, reception of a limited district commercial message in the embodiment of FIG. 1 will be described with additional reference to FIG. 5.

In the receiving apparatus 10 into which the district code has been registered in such a manner as described above, the character multiplex data extraction circuit 14 always functions so that character multiplex data of a channel being received are supervised by the CPU 21.

Figure 5:
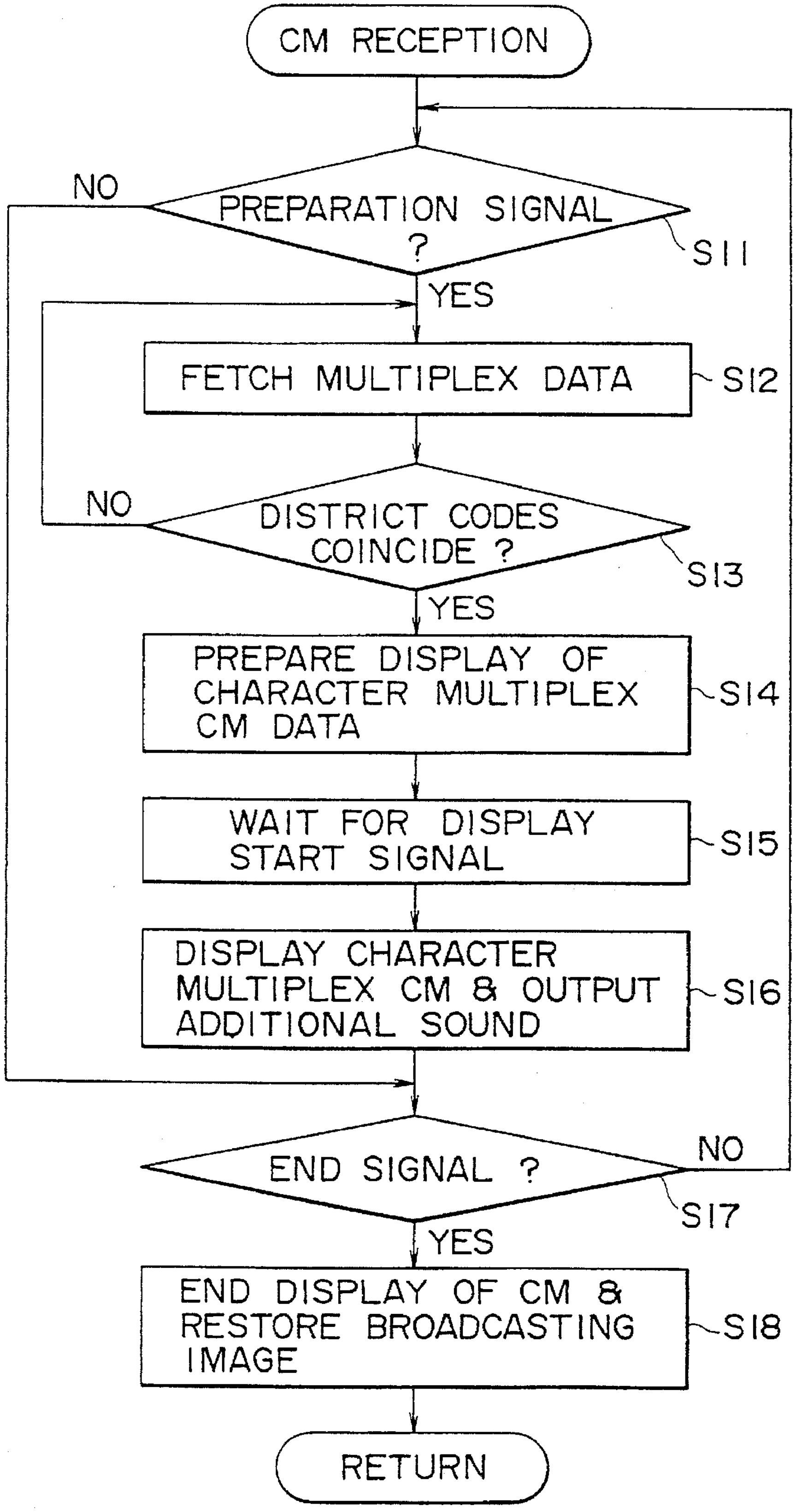
FIG. 5 is a flow chart illustrating another operation of the receiving apparatus shown in FIG. 1.

Then, in reception of a limited district commercial message, the CPU 21 waits until a preparation signal is broadcast prior to broadcast of commercial message data (step S11) as seen in FIG. 5, and after such preparation signal is received, commercial message data received subsequently are fetched into the DRAM 23 (step S12).

Then at step S13, it is discriminated whether or not the commercial message data thus fetched correspond to the preparation signal and coincide with the district data stored in the SRAM 24. When they do not coincide with each other, the operations at steps S12 and S13 are repeated, and though not shown, such processing for time-out is performed after a suitable number of times to eliminate an infinite loop.

When the district code of the commercial message data coincides with the set district code, a display image and additional sound data from the character multiplex data are converted into data which can be outputted as a display by way of a character string, a still picture or animation or additional sound and are prepared in the DRAM 23 (step S14). Thereafter, a display starting signal to which an identification number equal to that of the preparation signal is provided (step S15).

Though not shown, also here, time-out processing for eliminating an infinite loop or ending processing for the case wherein a display start signal is missed is required.

After the display start signal having the identification number equal to the preparation signal is received, a commercial message image by animation is displayed, using the data prepared in the DRAM 23 at step S13, normally in a mode in which the background is a raster pattern over a substantially entire area or part of the area of the screen of the receiving set 1 and the additional sound is outputted in a similar manner as in character multiplex broadcasting (step S16).

When the commercial message is broadcast successively, since such a preparation signal and a start signal as described above are repetitively broadcast in this order, the processes at steps S11 to S16 described above are performed successively on the receiving side.

Then, when a display end signal having an identification number same as that of the preparation signal is received (step S17), the character multiplex displaying of the commercial message is canceled and displaying of a video image of an ordinary broadcast is restored (step S18).

On the other hand, when an end signal is not received at step S17, the control sequence returns to the first step S11. Thus, if an end signal is not received within a predetermined interval of time after starting of the displaying at step S16, the displaying of the commercial message is ended compulsorily.

This similarly applies when the received channel is switched.

It is to be noted that the character multiplex broadcast can be visually observed also during such processes at steps S11 and S12 as described above. However, since the data of the commercial message are broadcast, data are delayed after some delay.

Further, as the commercial message data, moving picture information after compression may be multiplexed.

As described above, in the present embodiment, since a commercial message to which a hierarchic district code is added is broadcast in the form of a character multiplex broadcast on the broadcasting side while, on the receiving side, a particular district code corresponding to a receiving district is set as an identification number and only a received commercial message to which a district code which coincides with the identification number is applied is outputted, an area in which the commercial message can be received is limited and a plurality of commercial messages whose object areas are different from each other can be broadcast at a time.

Accordingly, the advertising rates can be reduced comparing with those required by a conventional television broadcast, and consequently, for example, even a small or medium enterprise or a small shop of the type which is closely related to a district can make use of such a locally districted advertisement of the character multiplex broadcasting type as described above readily.

It is to be noted that, as regards the requirement for coincidence between the identification number on the receiving side and the district code applied to the commercial message on the broadcasting station side, it is determined that they coincide with each other when, as a result of comparison beginning with the value of the uppermost place, the values of those places which have not been designated with "X" by the broadcasting station side or the values of all of the places coincide between them. This similarly applies to a plurality of district codes coupled by way of "&" or/and some other logical operator.

Meanwhile, a cable box identification number applied to a cable box of a CATV system is provided to accept a descrambling signal. Since such cable box identification numbers are numbered in order of contract, while it is possible to discriminate from a cable box identification number a district in which the subscriber resides, it is actually difficult to utilize the cable box identification number for the object of limitation in district. However, if a corresponding conversion table between a cable box identification number and a location of the cable box is prepared in advance, that is, if a location where a cable box is installed is registered in accordance with a box identification number without fail into the conversion table, then limitation of a district can be performed also with the box identification information using the conversion table.

[Various Modifications]

While, in the embodiment described above, a limited district commercial message is broadcast in the form of a character multiplex broadcast, further detailed information which may be different among different districts can be provided by limiting the district in which information which is normally broadcast in the entire country or a local area such as, for example, weather information or road information is to be broadcast so as to include, for example, an adjacent prefecture or prefectures.

It is to be noted that, of such information which relates to a particular district as described above, emergency information is preferably displayed in a superimposed fixed mode in which the background is provided by a video image of a television broadcast.

While the present invention is described above in connection with the case wherein information relating to a particular district is broadcast in the form of a character multiplex broadcast, the present invention is not limited to the specific embodiment described above, and also in a data broadcast or a digital broadcast, similar advantages can be anticipated by adding a district limit code to broadcasting data.

For example, in a satellite television broadcast, PCM sound is transmitted in the A mode or the B mode, and various data can be transmitted by way of a so-called data channel which makes use of bits which are not used for such transmission of sound.

Since, in the data channel, data are sent in the form of a packet and a service can be identified from a header portion of each packet, various data can be transmitted at a time, and accordingly, by adding a district code similarly as in the embodiment described above, for example, newspaper data for a prefecture can be loaded down limiting the object district to the prefecture.

Having now fully described the invention, it will be apparent to one of ordinary skill in the art that many changes and modifications can be made thereto without departing from the spirit and scope of the invention as set forth herein.

What is claimed is:

1. A multiplex broadcasting method wherein, on a broadcasting station side, sub broadcasting information is coded and then multiplexed with and broadcast together with main broadcasting information, and on a receiving side, the received multiplex broadcasting information is separated into the main broadcasting information and the coded sub broadcasting information and then the coded sub broadcasting information is decoded and outputted together with the main broadcasting information, comprising the steps of:

adding, on the broadcasting station side, district limit information defining a geographic area to the sub broadcasting information, coding the sub broadcasting information together with the district limit information and multiplexing the coded information with the main broadcasting information; and comparing, on the receiving side, particular district limit information defining a geographic area set on the receiving side and the district limit information added to the decoded sub broadcasting information with each other and outputting the decoded sub broadcasting information when the particular district limit information and the district limit information on the decoded sub broadcasting information coincide with each other.

2. A multiplex broadcasting method according to claim 1, wherein, on the broadcasting station side, individual district limit information is added to and coded together with a plurality of different kinds of sub broadcasting information and successively multiplexed with the main broadcasting information, and on the receiving side, only that sub broadcasting information of the plurality of successively decoded different kinds of sub broadcasting information whose district limit information coincides with the particular district limit information is outputted.

3. A multiplex broadcasting method according to claim 2, wherein the district limit information is a postal code number or a telephone exchange number.

4. A receiving method for a multiplex broadcast, comprising the steps of:

receiving multiplex broadcasting information;

separating coded sub broadcasting information from the received multiplex broadcasting station;

decoding the thus separated coded sub broadcasting information;

comparing district limit information defining a geographic area included in the decoded sub broadcasting information with particular district limit information defining a geographic area; and outputting the sub broadcasting information when the comparison proves that the particular district limit information and the district limit information of the sub broadcasting information coincide with each other.

5. A receiving method for a multiplex broadcast according to claim 4, wherein only that sub broadcasting information of a plurality of successively decoded and compared different kinds of sub broadcasting information whose district limit information coincides with the particular district limit information is outputted.

6. A transmitting and receiving method for a multiplex broadcast, comprising the steps of:

adding, on the transmitting side, district limit information defining a geographic area to sub broadcasting information, coding the sub broadcasting information together with the district limit information, multiplexing the coded information with main broadcasting information, and transmitting the multiplexed broadcasting information; and receiving, on a receiving side, the multiplexed broadcasting information, separating coded sub broadcasting information from the received multiplexed broadcasting station, decoding the thus separated coded sub broadcasting information, comparing district limit information included in the decoded sub broadcasting information with particular district limit information defining a geographic area, and outputting the sub broadcasting information when the comparison proves that the particular district limit information and the district limit information of the sub broadcasting information coincide with each other.

7. A transmitting and receiving method for a multiplex broadcast according to claim 6, wherein the district limit information is a postal code number or a telephone exchange number.

8. A multiplex broadcasting system, comprising, a broadcasting station including means for coding sub broadcasting information together with district limit information defining a geographic area, means for multiplexing the coded information with main broadcasting information, and means for transmitting the multiplexed broadcasting information; and a receiving apparatus including means for receiving the multiplexed broadcasting information from said broadcasting station, means for separating the coded sub broadcasting information from the received multiplexed broadcasting station, means for decoding the thus separated coded sub broadcasting information, means for comparing the district limit information included in the decoded sub broadcasting information with particular district limit information defining a geographic area and allowing outputting of the sub broadcasting information when the comparison proves that the particular district limit information and the district limit information of the sub broadcasting information coincide with each other.

9. A multiplex broadcasting system according to claim 8, wherein, in said broadcasting station, individual district limit information is added to and coded together with a plurality of different kinds of sub broadcasting information and successively multiplexed with the main broadcasting information, and in said receiving apparatus, only that sub broadcasting information of the plurality of successively decoded different kinds of sub broadcasting information whose district limit information coincides with the particular district limit information is outputted.

10. A multiplex broadcasting system according to claim 9, wherein the district limit information is a postal code number or a telephone exchange number.

11. A receiving apparatus for a multiplex broadcast, comprising:

receiving means for receiving multiplex broadcasting information;

separating means for separating coded sub broadcasting information from the received multiplex broadcasting station;

decoding means for decoding the thus separated coded sub broadcasting information;

storage means for storing particular district limit information defining a geographic area;

comparing means for comparing the particular district limit information stored in said storage means and district limit information defining a geographic area included in the sub broadcasting information decoded by said decoding means with each other; and means for outputting the sub broadcasting information when it is determined by said comparing means that the particular district limit information of said storage means and the district limit information of the sub broadcasting information coincide with each other.

12. A receiving method for a multiplex broadcast according to claim 11, wherein only that sub broadcasting information of a plurality of different kinds of sub broadcasting information successively decoded by said decoding means and successively compared by said comparing means whose district limit information coincides with the particular district limit information is outputted.

13. A transmitting and receiving apparatus for a multiplex broadcast, comprising:

a transmitting apparatus including means for adding district limit information defining a geographic area to sub broadcasting information, coding means for coding the sub broadcasting information together with the district limit information, multiplexing means for multiplexing the coded information with main broadcasting information, and transmitting means for transmitting the multiplexed broadcasting information; and a receiving apparatus comprising receiving means for receiving the multiplexed broadcasting information, separating means for separating the coded sub broadcasting information from the received multiplexed broadcasting station, decoding means for decoding the thus separated coded sub broadcasting information, storage means for storing particular district limit information defining a geographic area, comparing means for comparing the district limit information included in the decoded sub broadcasting information with the particular district limit information stored in said storage means, and outputting means for outputting the sub broadcasting information when it is determined by said comparing means that the particular district limit information and the district limit information of the sub broadcasting information coincide with each other.

14. A transmitting and receiving apparatus for a multiplex broadcast according to claim 13, wherein the district limit information is a postal code number or a telephone exchange number.

15. The method of claim 4, further comprising the steps of:

storing at least a portion of the sub broadcasting information;

wherein the step of outputting the sub broadcasting information includes the following substeps:

receiving a start signal indicating that the sub broadcasting information is to be output; and outputting the sub broadcasting information if the following conditions are met: (1) the start signal has been received and (2) the comparison proves that the particular district limit information and the district limit information coincide.

16. The method of claim 15, further comprising the step of:

receiving a preparation signal prior to step of receiving multiplex broadcast information, wherein the preparation signal identifies the multiplex broadcast information to be received.

17. The method of claim 16, further comprising the steps of:

wherein the preparation signal and the start signal each contain an identification number;

comparing the identification number of the start signal with the identification number of the preparation signal;

wherein the step of outputting the sub broadcasting information includes the substep of outputting the sub broadcasting information if the following conditions are met: (1) the identification numbers match, (2) the start signal has been received and (3) the particular district limit information and the district limit information coincide.

18. The method of claim 17, further comprising the steps of:

receiving an end signal;

in response to the step of receiving an end signal, stopping the outputting of the sub broadcasting information.

19. The method of claim 18, wherein the end signal includes an identification number that matches the identification number of the preparation signal.

20. The method of claim 19, further comprising the step of:

stopping the outputting of the sub broadcasting information if the end signal is not received within a predetermined time period after the start signal has been received.

21. The method of claim 4, further comprising the steps of:

repeating the step of receiving multiplex broadcasting information, wherein the repeatedly received multiplex broadcasting information includes the same sub broadcasting information to ensure that correct sub broadcasting information is received.

22. The method of claim 4, wherein a television set operated by a user is used to perform the receiving step, further comprising the step of:

entering, by using the receiver to receive user input commands, the particular district limit information.

* * * * *